(12) United States Patent
Richter et al.

US006944902B1

(10) Patent No.: US 6,944,902 B1
(45) Date of Patent: Sep. 20, 2005

(54) PIPE CONDUIT VEHICLE

(75) Inventors: Thomas Richter, Linkenheim (DE);
Frank Gunter, Karlsruhe (DE);
George Franklyn Bremner, Sutton (CA); Corry Comello, Scarborough (CA)

(73) Assignee: PII Pipetronix GmbH, Karlsruhe (DE)

( * ) Notice: Subject to any disclaimer, the term of this patent is extended or adjusted under 35 U.S.C. 154(b) by 0 days.

(21) Appl. No.: 09/449,933

(22) Filed: Nov. 24, 1999

(30) Foreign Application Priority Data

May 7, 1998 (DE) .......................................... 198 20 290

(51) Int. Cl.[7] ................................................ B08B 9/04
(52) U.S. Cl. ................................................ 15/104.061
(58) Field of Search ................. 15/3.5, 3.51, 104.061, 15/104.062, 104.063; 166/153

(56) References Cited

U.S. PATENT DOCUMENTS 3,088,491 A    5/1963  Howard
5,208,936 A  * 5/1993  Campbell
5,903,946 A  * 5/1999  Collins et al.
6,070,285 A  * 6/2000  Geppert
6,098,231 A  * 8/2000  Smith et al.
6,190,090 B1 * 2/2001  Campbell et al.

FOREIGN PATENT DOCUMENTS

EP         0 065 049    11/1982
WO         WO 97 17566   5/1997

* cited by examiner

Primary Examiner—Terrence R. Till
(74) Attorney, Agent, or Firm—Paul Vincent

(57) ABSTRACT

A pipe conduit vehicle having a substantially cylindrical housing and with at least one ring-shaped sealing element disposed between the outer side of the housing and the inner wall of the pipe conduit can be moved in the pipe conduit via the transport fluid flow. The pipe conduit vehicle thereby comprises at least one inlet opening and at least one outlet opening which form a bypass through the inner portion of the housing to reduce the pressure differential before and after the pipe conduit vehicle, wherein the at least one inlet opening is disposed on the outer surface of the cylindrical housing.

18 Claims, 2 Drawing Sheets

PIPE CONDUIT VEHICLE

PIPE CONDUIT VEHICLE

This application claims Paris Convention priority of DE 198 20 290.3 filed May 7, 1998 the complete disclosure of which is hereby incorporated by reference

BACKGROUND OF THE INVENTION

The invention concerns a pipe conduit vehicle which can be moved within the pipe conduit via a transport fluid flow, comprising a housing having an outer surface and with at least one outer ring-shaped sealing element as well with at least one inlet opening and at least one outlet opening on the housing before and behind the sealing element to form a bypass.

Pipe conduit vehicles of this kind, which are designated as pigs, are used for the inspection or cleaning of pipelines which is of primary importance in pipelines in which poisonous or dangerous gases or liquids such as natural gas or liquid oil products are transported.

The above described pipe conduit vehicle can be the cleaning or inspection vehicle itself or can serve as a pulling vehicle or module therefor.

Pipe conduit vehicles usually have a ring-shaped sealing element on their housing for sealing the gap between the housing and the inner wall of the pipe conduit, wherein the corresponding pressure build-up drives the pipe conduit vehicle. The maximum working speed of the pipe conduit vehicle itself or of the cleaning or inspection unit pulled thereby is normally substantially less than the flow velocity of the medium being transported so that the vehicle must move slower than the fluid flow. Since economical considerations prohibit a reduction in pressure within the pipe conduit to reduce the flow velocity when carrying out the necessary repairs or inspection processes, appropriate measures must be taken to reduce the velocity of the pipe conduit vehicle relative to the flow velocity.

Towards this end, a plurality of possibilities have been proposed for reducing the drive force acting on the pipe conduit vehicle, optionally as a pull module for a cleaning or inspection vehicle, by bypassing the sealing element inside the housing.

Flow through the housing is thereby effected via tubes substantially parallel to the longitudinal axis of the pipe conduit vehicle (CA 2042338, EP 0 065 049 B1) or via one or a plurality of openings on the backside of the pipe conduit vehicle (WO 97/17566).

The active flow through cross-sectional area of the bypass can thereby be changed using valve caps in the tubes (EP 0 065 049 B1) or by means of two sealing elements, disposed one behind the other, each having openings which can be aligned with respect to each other by relative rotation of the elements (CA 2042338, WO 97/17566). These changes can be initiated by control and regulation devices which measure the actual speed of the pipe conduit vehicle and regulate same to approach a desired speed through appropriate changes in the flow-through cross-sectional area.

These conventional embodiments have the disadvantage of substantial technical difficulty associated with tubes and with the closing elements needed for each tube as well as poor fluid dynamics for the flow entrance on the rear end.

It is the underlying purpose of the invention to configure a pipe conduit vehicle in such a fashion that a simple and reliable regulation of the speed is possible without having the above mentioned disadvantages.

This purpose is achieved in accordance with the invention with a pipe conduit vehicle of the above mentioned kind in that the at least one inlet opening which can be closed by a closing element is disposed on the outer wall of the cylindrical housing.

This at least one flow opening disposed on the longitudinal side of the housing leads to improved fluid dynamics for the fluid flowing through the housing.

The bypass can be closed and the amount of fluid flowing therein regulated using the closing element for closing the at least one inlet opening to increase the drive pressure on the rear side of the pipe conduit vehicle opposite the direction of travel thereof. The configuration of the inlet opening for the bypass flow and of the closing element therefor in or on the outer wall facilitates reduced adjusting forces for setting the closing element. The closing element is also insensitive to soiling.

The closing element can be advantageously displaced along the outer surface of the cylindrical housing to adjust the fluid volume flowing through the housing. This displacement is preferentially effected continuously to facilitate a precise adjustment of the at least one opening, wherein the closing element itself is advantageously part of the outer surface of the housing and introduced therein.

A preferred embodiment provides for control devices to activate the at least one closing element which can displace the closing element.

Although the adjustment devices can, in principle, be electrical, pneumatic or hydraulic devices are preferred.

The pipe conduit vehicle preferentially comprises measurement and regulation members for regulation of a predetermined desired speed. These measuring members facilitate determination of the current speed of the pipe conduit vehicle and comparison of same to the predetermined intended velocity to regulate to this velocity using appropriate measures.

The measuring members of the pipe conduit vehicle are thereby preferentially in mechanical contact with the pipe conduit wall in order to determine the absolute speed of the pipe conduit vehicle independent of the flow velocity of the fluid. This mechanical contact is preferentially effected via measuring wheels which facilitate a simple construction for determining the velocity with low susceptibility to malfunction.

The measuring members and the control devices are preferentially disposed axially between two sealing elements so that they do not cause turbulence within the flowing fluid.

In an additional advantageous embodiment, the outlet opening of the pipe conduit vehicle is formed on the end side. The transport fluid flowing through the housing with high speed can thereby exit therefrom in a manner exhibiting advantageous flow properties.

The outlet openings on the end side are preferentially delimited with respect to each other by means of radial braces which subdivide the end of the pipe conduit vehicle into smaller symmetrical segments.

The outlet openings can preferably each be closed by closing elements which can pivot about the braces. This effects a second closing mechanism independent of the closing mechanism on the inlet openings which can e.g. be utilized when the pipe conduit vehicle is stationary or after a predetermined period of time.

The pivot direction of the closing elements is preferentially that of the flow direction of the fluid so that no additional forces must be utilized for closing them.

The closing elements are preferentially secured in the open position via magnetic holders. This guarantees a reliable holding in the open position as well as a rapid release of the closing elements, wherein a release mechanism is also advantageously provided for.

In accordance with a preferred improvement, the closing elements comprise openings which can be closed by spring-loaded flaps. The openings in the closing elements reduce the size of the input flow surface of the closing elements. When the spring-loaded flaps open in response to a pressure wave associated with closing the closing elements, this pressure wave is damped to thereby avoid damage to the closing elements or their abutment surfaces on the housing. When the incoming flow pressure drops below a certain value, the spring located flaps seal the openings in the closing elements.

The invention is described below with reference to the embodiments indicated in the drawing.

DESCRIPTION OF THE PREFERRED EMBODIMENT

Figure 1:
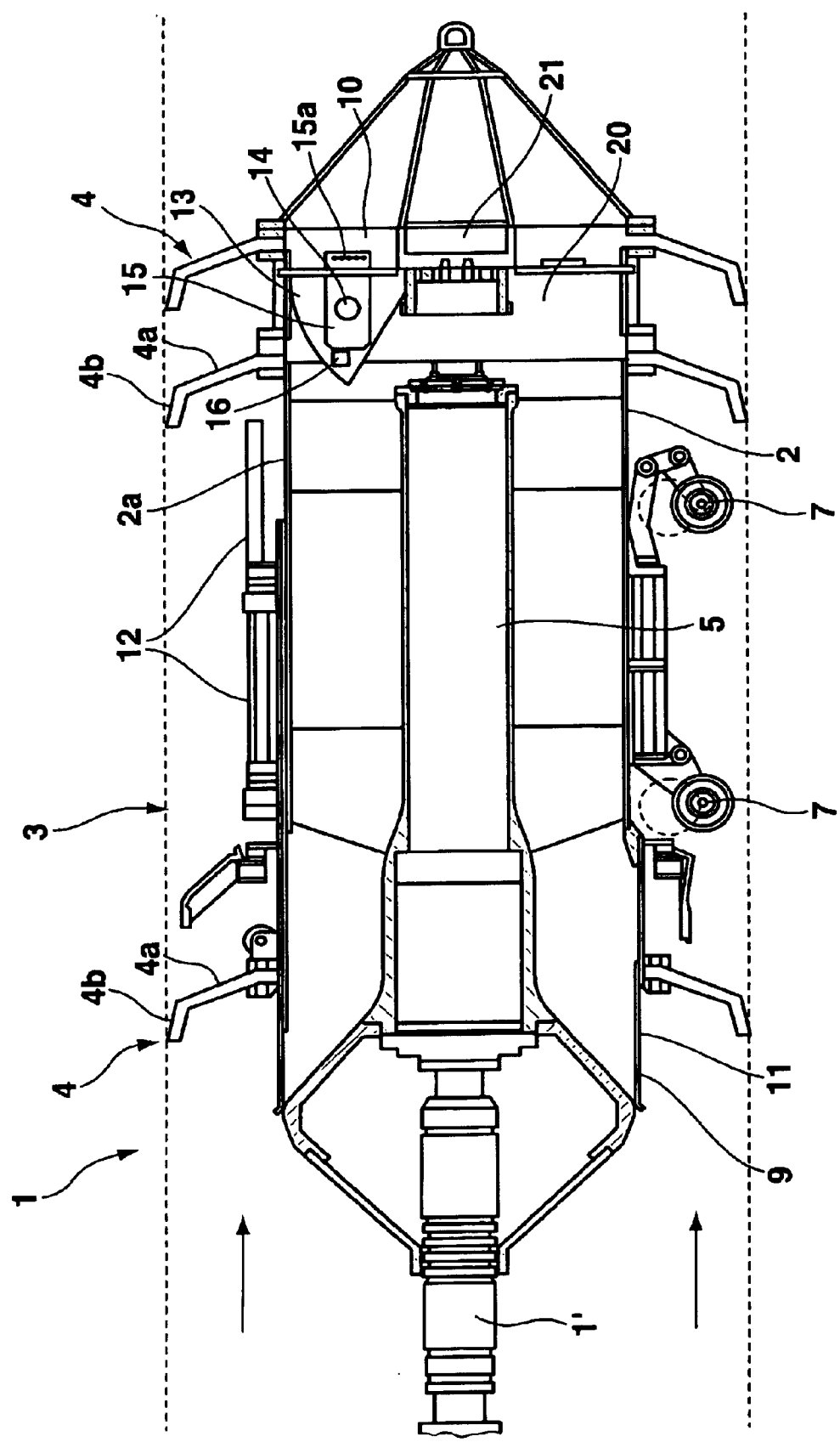
FIG. 1 shows a longitudinal cut of a first embodiment of a pipe conduit vehicle.

A pipe conduit vehicle 1 in accordance with the invention comprises a cylindrical housing 2 having an outer wall 2a and ring-shaped sealing collars 4 disposed between the outer wall 2a and a schematically indicated pipe conduit inner wall 3. The pipe conduit vehicle 1 in accordance with the invention can be a pulling module for pulling, via coupling element 1, additional modules of a cleaning or inspection pig. Each ring-shaped sealing collar 4 has a first section 4a tilted towards the rear and a second section 4b which is tilted with respect to the first section 4a and which extends in a backward direction to seat, under pressure, on the inner wall of the pipe conduit. The second section forms a seal at the inner wall of the pipe conduit 3 and therefore guarantees the necessary pressure build-up on the input flow side of the sealing collar 4 for the forward drive. Spring-loaded wheels 7 are disposed on the outer wall 2a of the cylindrical housing 2 between two ring-shaped sealing elements 4. The wheels 7 are in constant contact with the inner wall of the pipe conduit and guarantee a separation between the housing 2 and the wall of the pipe conduit. At least one of the wheels 7 is thereby configured as a measuring wheel for recording the absolute velocity of the pipe conduit vehicle 1.

The cylindrical housing 2 is substantially configured as a hollow cylinder forming at least one bypass for the fluid, the flow velocity of which is normally significantly higher than the maximum working velocity of the pipe conduit vehicle.

In order to open the bypass, the pipe conduit vehicle has an inlet opening 9 and at least one outlet opening 10 on the end of the pipe conduit vehicle. The inlet opening 9 is thereby disposed in the outer surface of the cylindrical housing 2 upstream of the last sealing collar 4. The inlet opening 9 can be closed by a ring-shaped closing element 11 which can be displaced parallel to the outer surface of the cylindrical housing 2. The displacement of the closing element 11, which is substantially aligned with the outer surface of the housing 2, is effected by means of actuators 12 with which the element 11 can be continuously displaced to change the inlet opening 9 between a state of complete opening and one of complete closure. In the embodiment shown, the actuators 12 are configured as hydraulic or pneumatic cylinders which displace the closing element 11.

The actuators 12 are activated by controlling devices (not shown) in dependence on the actual determined value of the velocity of the pipe conduit vehicle for adjusting the velocity of the pipe conduit vehicle to a predetermined intended value using the inlet opening 9 and the bypass stream associated therewith.

The outlet openings 10 can also be closed by means of closing elements 13 which can pivot at radial braces 20 disposed between the cylindrical housing 2 and a cylindrical component 21 positioned along the longitudinal axis of the pipe conduit vehicle. When the bypass is closed, pressure increases behind the pipe conduit vehicle resulting in an increase in the acceleration force acting on the pipe conduit vehicle. The closing elements 13 are kept in the opened position via magnet holders 16 which can e.g. be radio controlled or time actuated. The magnet holders 16 can also function as a release mechanism. In the open position, the closing elements 13 are pivoted against the flow direction of the fluid and are parallel thereto so that they are pivoted into the closing position by the fluid flow after release of the magnet holders.

In the embodiment shown, the closing elements 13 have openings 14 which can be closed by flaps 15. The flaps 15 are thereby disposed for pivoting on the closing elements 13 and are spring-loaded 15a towards the closing direction of the flaps 15.

When the closing elements 13 are initially closed, in particular for the case in which a pipe conduit vehicle which is fixed within the pipe conduit is to be once more set into motion through closing of the elements 13, the flaps 15 open in response to the associated pressure wave and in opposition to their spring-loading. The freed openings 14 thereby reduce the pressure wave. Damage to the closing elements 13 or to abutment surfaces on the housing is thereby avoided. When the pipe conduit vehicle has once more started to move, the openings 14 are closed by the spring-loaded flaps to increase the drive force.

Figure 2:
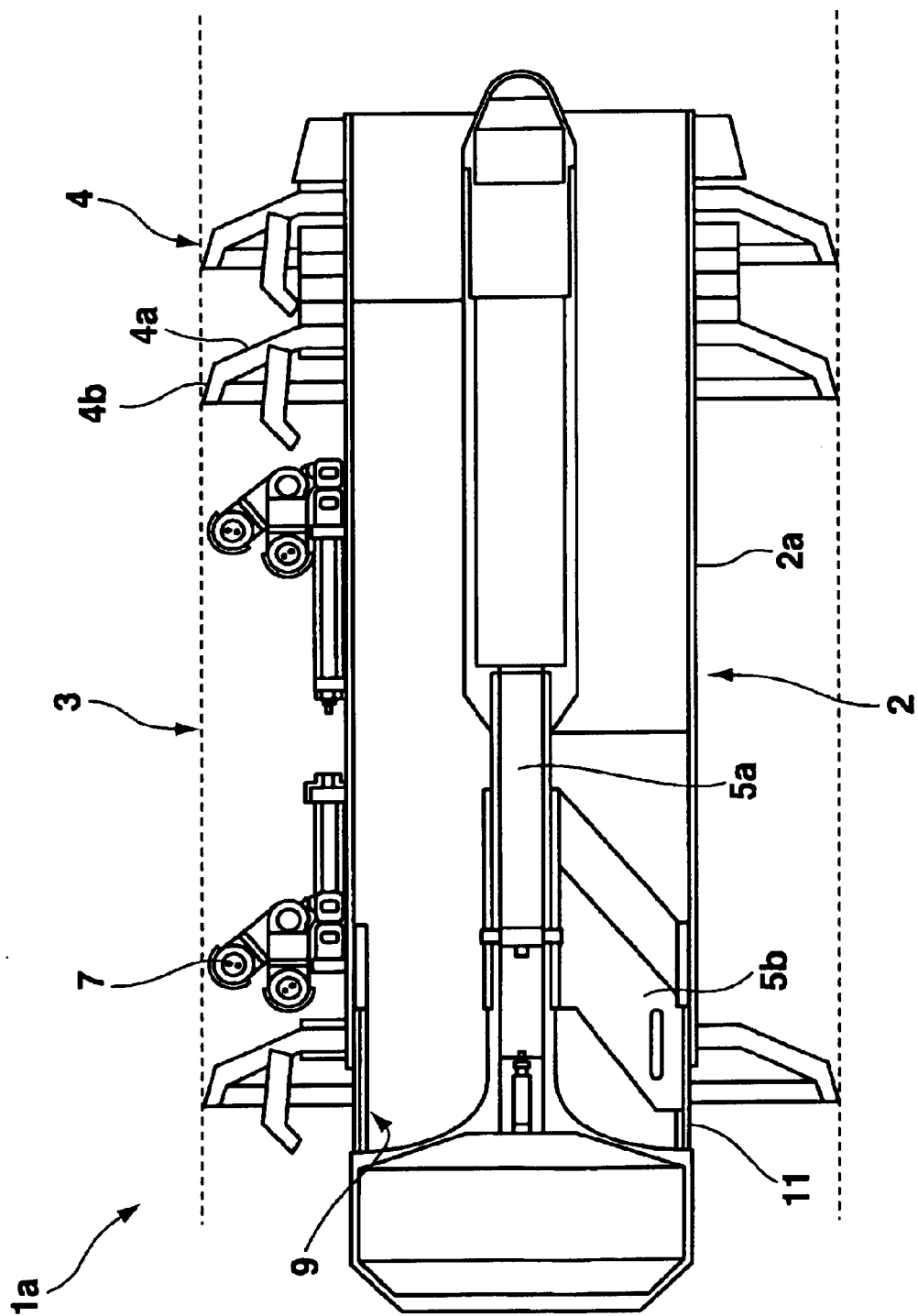
FIG. 2 shows a schematic view of another embodiment of a pipe conduit vehicle.

A more schematically represented embodiment of a pipe conduit vehicle 1a in accordance with FIG. 2 primarily differs from the pipe conduit vehicle of FIG. 1 in that the actuators are not disposed on the peripheral outer side of the housing 2 of the pipe conduit vehicle 1a, rather a central actuator 5a is disposed in the middle of the housing 2. The actuator 5a is connected via axis parallel pins 5b, for movement thereof, to a ring-shaped closing element 11, which can close the opening 9 in the outer wall of the housing 2a. Additional elements of the pipe conduit vehicle 1a of FIG. 2 are designated with the same reference symbols used in FIG. 1.

We claim:

1. A pipe conduit vehicle which can be moved in pipe conduits via a transport fluid flow, the vehicle comprising:

a first ring-shaped outer sealing element for sealing the vehicle at an inner wall of the pipe conduit;

a cylindrical housing with an outer wall having an outer surface, said outer wall also having an inlet opening upstream of said first sealing element, said housing having an outlet opening downstream of said first sealing element, said inlet opening and said outlet opening forming a bypass; and a first closing element disposed on said housing for opening and closing said inlet opening, wherein said first closing element is displaced parallel to said outer surface for opening and closing said inlet opening.

2. The pipe conduit vehicle of claim 1, wherein said first closing element is aligned with said outer surface.

3. The pipe conduit vehicle of claim 1, wherein said first closing element is displaced in a continuous fashion for opening and closing said inlet opening.

4. The pipe conduit vehicle of claim 1, further comprising an actuator for operating said first closing element.

5. The pipe conduit vehicle of claim 4, further comprising a second ring-shaped outer sealing element disposed downstream of said first outer sealing element, wherein said actuator is disposed axially between said first and said second sealing elements.

6. The pipe conduit vehicle of claim 4, wherein said actuator is one of pneumatic and hydraulic.

7. The pipe conduit vehicle of claim 1, further comprising a velocity measuring member.

8. The pipe conduit vehicle of claim 7, wherein said velocity measuring member is disposed in contact with the inner wall of the pipe conduit.

9. The pipe conduit vehicle of claim 7, wherein said measuring member comprises measuring wheels.

10. The pipe conduit vehicle of claim 7, further comprising a second ring-shaped outer sealing element disposed downstream of said first sealing element, wherein said measuring member is disposed axially between said first and said second outer sealing elements.

11. The pipe conduit vehicle of claim 1, wherein said outlet opening is formed on an end of said housing.

12. The pipe conduit vehicle of claim 1, wherein said outlet opening is subdivided by radial braces.

13. The pipe conduit vehicle of claim 12, further comprising second closing elements which can pivot for closing said outlet opening.

14. The pipe conduit vehicle of claim 13, wherein said second closing element have openings which can be closed by spring-loaded flaps.

15. The pipe conduit vehicle of claim 13, wherein said second closing elements pivot at said outlet opening about said radial braces.

16. The pipe conduit vehicle of claim 13, wherein a pivot direction of said second closing elements is along a direction of the transport fluid flow.

17. The pipe conduit vehicle of claim 13, further comprising magnet holders for securing said second closing elements in an opened position.

18. The pipe conduit vehicle of claim 1, wherein said first closing element comprises a first release mechanism and said second closing element comprises a second release mechanism.

* * * * *